United States Patent [19]

Small

[11] 4,277,692
[45] Jul. 7, 1981

[54] CONTINUOUS POWER SOURCE WITH BI-DIRECTIONAL CONVERTER

[75] Inventor: Kenneth T. Small, Cupertino, Calif.

[73] Assignee: Tab Products Company, Palo Alto, Calif.

[21] Appl. No.: 45,573

[22] Filed: Jun. 4, 1979

[51] Int. Cl.³ .............................................. H02J 9/00
[52] U.S. Cl. ....................................... 307/66; 363/97; 363/133
[58] Field of Search ...................... 307/64, 66; 363/96, 363/97, 131, 133, 134, 135, 139

[56] References Cited

U.S. PATENT DOCUMENTS

| | | | |
|---|---|---|---|
| 3,317,816 | 5/1967 | Wilting | 363/135 |
| 3,612,909 | 10/1971 | Imabayashi | 363/134 X |
| 3,634,748 | 1/1972 | Rudert | 363/139 |
| 3,986,098 | 10/1976 | Tamii et al. | 307/64 X |

Primary Examiner—William ZM. Shoop
Attorney, Agent, or Firm—John L. McGannon

[57] ABSTRACT

A power source provides continuous AC power by employing a bi-directional converter which interfaces a rechargable DC power storage device with AC mains power and AC loads. The bi-directional converter includes a transformer having first and second windings coupled in reverse polarity through dual switching means in parallel with one another. The switching means are coupled to a state controller responsive to conditions at the AC mains terminal, the AC load terminal and the DC power terminal. There are two general operating conditions, an active condition wherein DC power is provided to the AC load, and a standby condition wherein power is recovered by the DC storage device. In the standby condition, the converter operates in a so-called "flyback" mode to recover power and to direct it to the DC storage device. In the active condition, the converter is pulse-width modulated according to a predetermined duty cycle to produce an AC sine wave output at the AC load terminals. Where the AC load includes reactive components, the converter operates to recover unused power from the load and to transfer power back to the DC power source whenever the polarity of the output voltage differs from the polarity of the output current.

5 Claims, 8 Drawing Figures

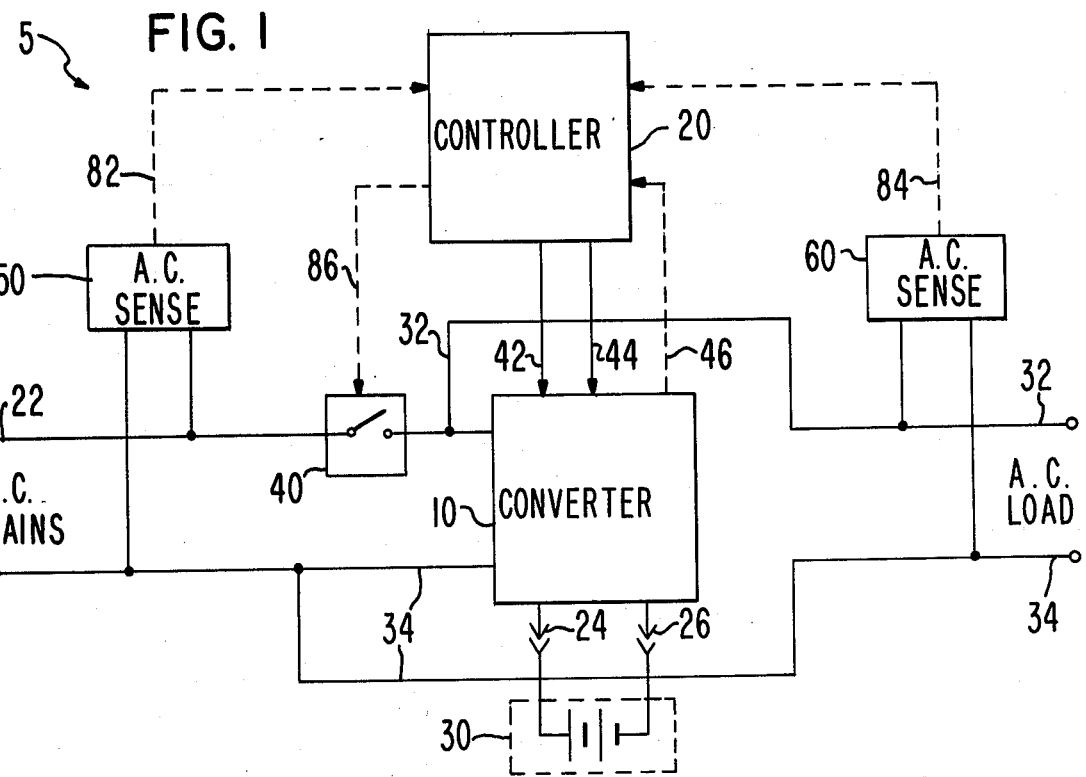

CONTINUOUS POWER SOURCE WITH BI-DIRECTIONAL CONVERTER

BACKGROUND OF THE INVENTION

This invention relates to a continuous power systems which provide standby power to computers, telecommunications equipment, process controllers and like equipment where uninterrupted power is requisite for reliable operation. In particular, the invention relates to a bi-directional AC to DC and DC to AC converter for use in a continuous power system.

One type of common continuous power system comprises a DC power storage device, or battery, coupled to a DC to AC converter which can be coupled to AC load terminals through a switch whenever AC mains power fails. AC mains power is normally coupled to AC load terminals when the continuous power system is in a standby condition. The continuous power system generally includes a separate charging subsystem in order to maintain the DC power storage device in readiness. Such charging subsystems add weight and cost to the continuous power system, and they are typically of relatively low recharge capacity. Consequently, a considerable amount of time is required to bring a discharged DC power storage device back to full readiness. A second type of continuous power system includes both an AC to DC converter and a DC to AC converter and a battery floating near the DC potential. All components are essentially operating at all times, and the capacity of the AC to DC converter must be comparable to the capacity of the DC to AC converter. Such systems are expensive and heavy.

A concern with known continuous power systems is the adverse effects of reactive loads on system operation. Reactive loads have been known to cause instabilities which result in poor performance and can cause system failure. There is a need for a lightweight continuous power supply which is capable of efficiently driving reactive loads yet which is capable of rapid recharge. A particular application of such a system would be in portable operation.

SUMMARY OF THE INVENTION

Accordingly, a continuous power system incorporates a bi-directional converter having a push-pull transformer and a flux storage transformer with a first winding and a second winding. The first winding is coupled between one end tap of the push-pull transformer and a first switching circuit. The second winding is coupled in reverse polarity with respect to the first winding between a second end tap of the push-pull transformer and a second switching circuit. The two switching circuits are connected in parallel to a common terminal of DC power storage device, such as a battery. Selected switching cycles and duty cycles of the switching circuits cooperate with the residual flux stored in the flux storage transformer to drive any type of AC load, whether resistive or reactive, or to charge the DC power storage device. The bi-directional converter is operative in both a standby condition and an active condition. In the standby condition, wherein AC mains power is coupled to the AC load, the converter operates in a so-called "flyback" mode to recharge the DC power storage device. In the active condition, wherein the DC storage device provides power to the AC load, the switching circuits are pulse-width modulated at a predetermined duty cycle to produce an AC sine wave output at the desired line frequency at the AC load terminals. In addition, in the active condition, the converter is operative to recover undissipated reactive power components from the AC load when the polarity of the output voltage differs from the polarity of the output current, thereby increasing the efficiency and discharge lifetime of the system.

Further objects and advantages of the invention will be apparent upon reference to the following detailed description of preferred embodiments taken into conjunction with the following drawings.

BRIEF DESCRIPTION OF THE DRAWINGS

FIG. 1 is a block diagram of a continuous power system according to the invention.

FIG. 2 is a schematic diagram of one preferred embodiment of a bi-directional converter according to the invention.

DETAILED DESCRIPTION OF PREFERRED EMBODIMENTS

Figure 3:
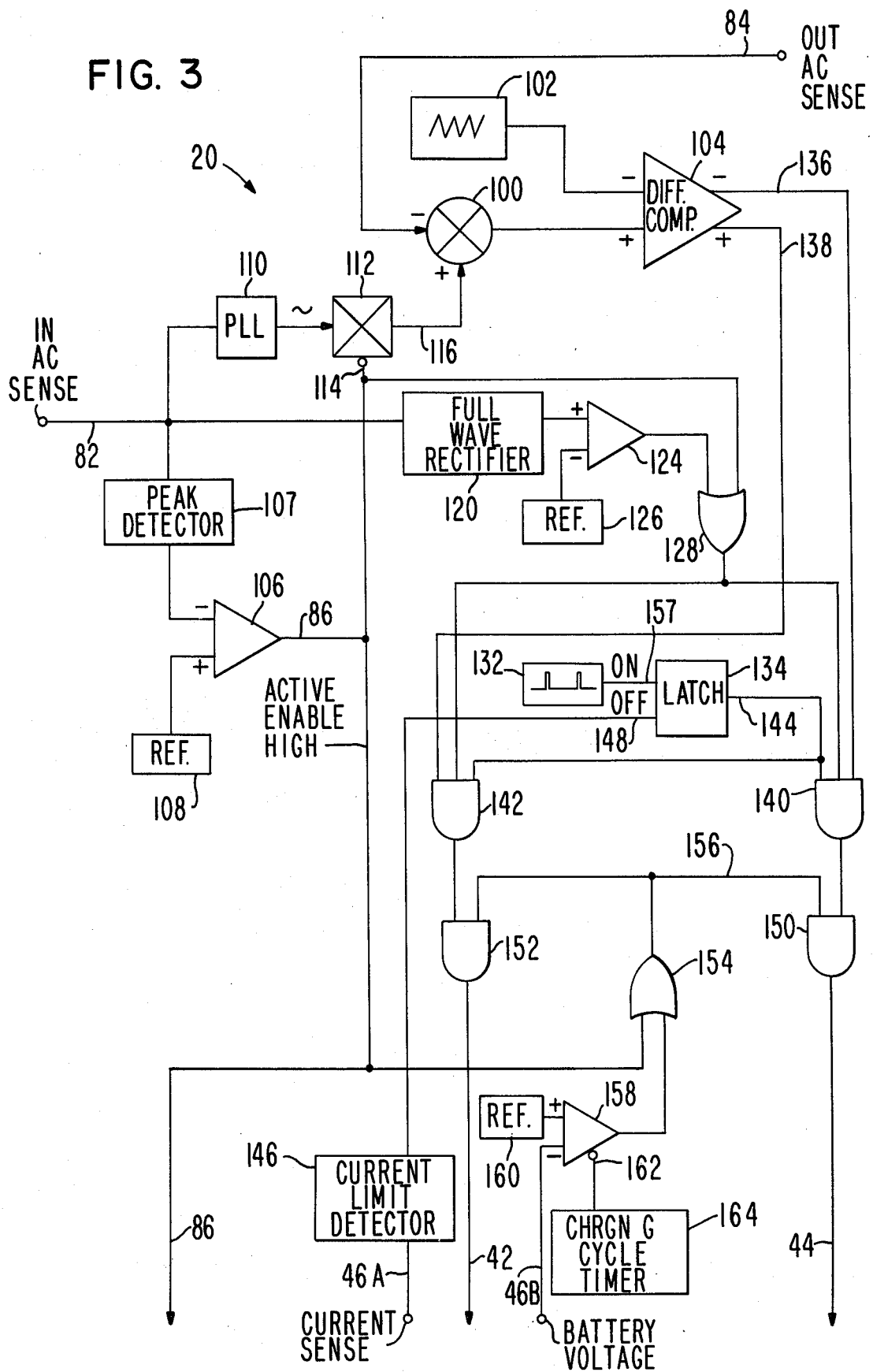
FIG. 3 is a block diagram of a controller suitable for use in a power system according to the invention.

Referring first to FIG. 1, there is shown a continuous power system 5 comprising a bi-directional converter 10, to which is coupled a controller 20 and a DC storage device, or battery 30. A controlled switch 40 is disposed between AC mains line 22 and AC load line 32. The converter 10 is coupled across the AC load line 32 and a common conductor 34. For simplicity a two-wire circuit is shown. However, a three-wire circuit with a ground conductor (not shown) could also be employed. The battery 30 is coupled to the converter 10 through first and second battery terminals 24 and 26.

An input AC sensing circuit 50 is coupled across the AC mains line 22 and the common 34 through line 82 to provide voltage and phase signals to the controller 20. An output AC sensing circuit 60 is coupled across the AC load line 32 and common 34 through line 84 to provide at least phase information to the controller 20.

Through line 86, the controller 20 operates switch 40. Through lines 42 and 44 the controller 20 operates the converter 10, as hereinafter explained. Through line 46, the converter 10 provides a feedback signal, particularly battery current to the controller 20, as hereinafter explained.

Referring to FIG. 2 there is shown a converter 10 according to the invention. The converter 10 comprises an input/output (I/O) transformer 36 having a first primary 33 and second primary 35 coupled in push-pull relation. A symmetric center tap 27 is connected to battery terminal 26 (FIG. 1). The secondary 37 is coupled to the AC lines 32, 34 (FIG. 1).

The end tap of primary 33 is coupled to the first end tap of the first winding 72 of a flux storage transformer 75. The second end tap of winding first 72 is coupled to a first controlled power switch ($Q_1$) 52, such as the emitter of a power transistor. Transistor banks and thyristors could also be used for the power switch. A voltage $V_1$ is measured between the node of the second end tap and a fixed reference, namely terminal 26 on the negative side of the battery 30.

The end tap of primary 35 is coupled to the second end tap of second winding 74 of the flux storage transformer 75. The first end tap of second winding 74 is coupled to a second controlled power switch ($Q_2$) 54. According to the invention, it is required that the end tap of primary 35 be coupled to that end tap of winding 74 which is in reverse polarity to the coupling of the end tap of primary 33 coupled to the end tap of winding 72. In all other respects, the circuit of the converter 10 is symmetric with respect to the center tap of I/O transformer 36, as will be seen hereinafter.

A voltage $V_2$ is measured at the node of second power switch 54 with second winding 74 with reference to battery terminal 26.

Controlled power switches 52 and 54 are constrained to permit power flow in only one direction, for example, from DC power terminal 24 to flux storage transformer 75. A first diode ($D_1$) 56 is coupled across first controlled power switch 52 to direct power flow in a sense of opposing allowable power flow through first controlled power switch 52. Similarly, a second diode ($D_2$) 58 is coupled across second controlled power switch 54 to direct power flow in a sense opposite to permitted power flow through second controlled power switch 54. The common node of first controlled power switch 52, first diode 56, second power switch 54 and second diode 58 is coupled to the output terminal 24 of the battery 30 (FIG. 1). A small current sensing resistor 49 may be provided in this loop. For example, an amplifier 47 may direct a signals representative of the battery current and the battery voltage to the controller 20 (FIG. 1) through lines 46A and 46B.

First and second controlled switches 52, 54 are externally switched by the controller 20 (FIG. 1). For this purpose, first and second controlled switches 52, 54 are gated through lines 42 and 44, respectively.

Figure 4:
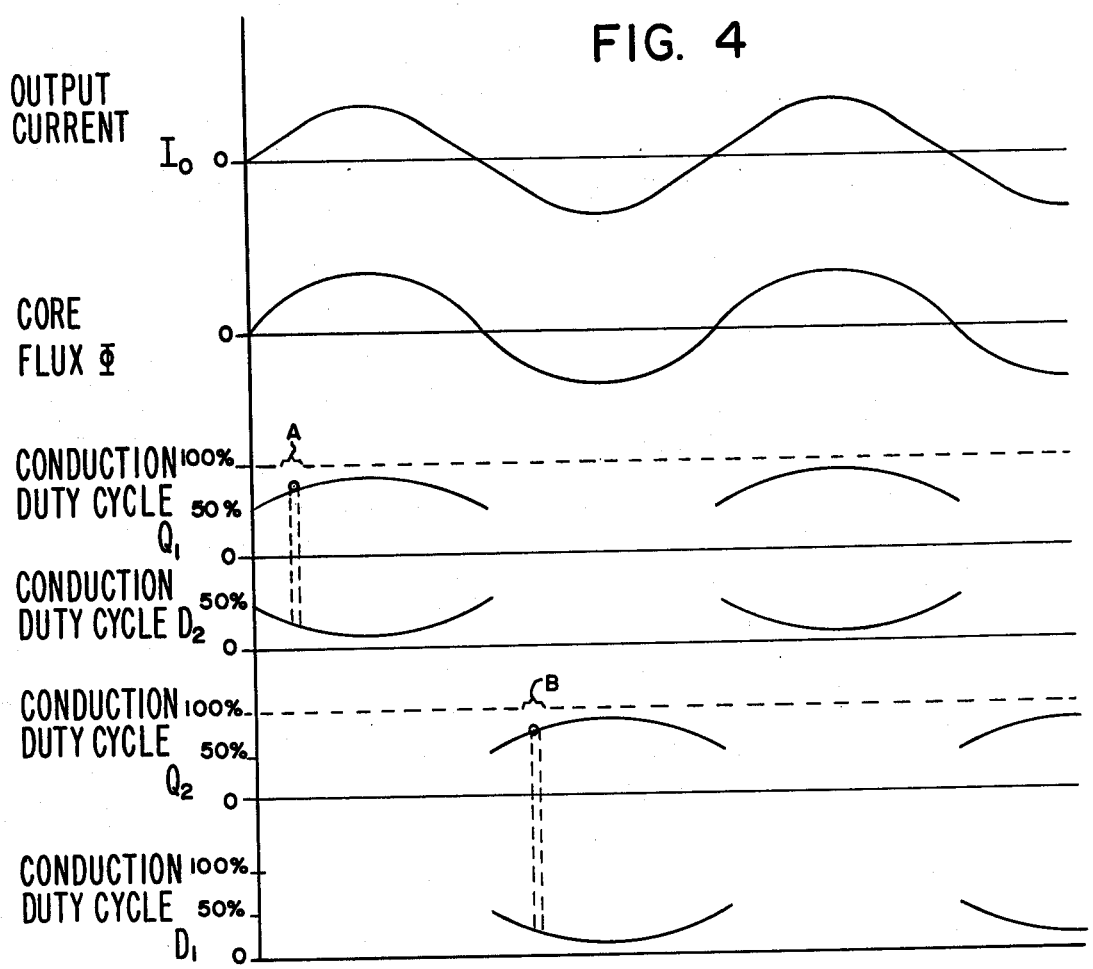
FIG. 4 depicts wave forms and duty cycles of the system over a repetitive line frequency cycle during its active condition driving a resistive load.

Referring to FIG. 2 in connection with FIG. 4, there is illustrated one operating condition of the converter 10, namely the condition in which the battery is active and net power is flowing from the battery 30 through lines 24 and 26 to the secondary 37 of I/O transformer 36 and thence to the AC load across lines 32 and 34. There is a line frequency cycle and a high frequency switching duty cycle associated with each of the switches 52, 54. The line frequency cycle is constant at, for example, a 60 Hz rate for a typical power system. The switches 52, 54 change state at a rate of approximately 20 kHz in the preferred system. The duty cycle of the switches 52, 54 and the portion of the line frequency cycle during which the switches 52, 54 are driven determine the nature of the active condition and the direction of net power flow.

Figure 5:
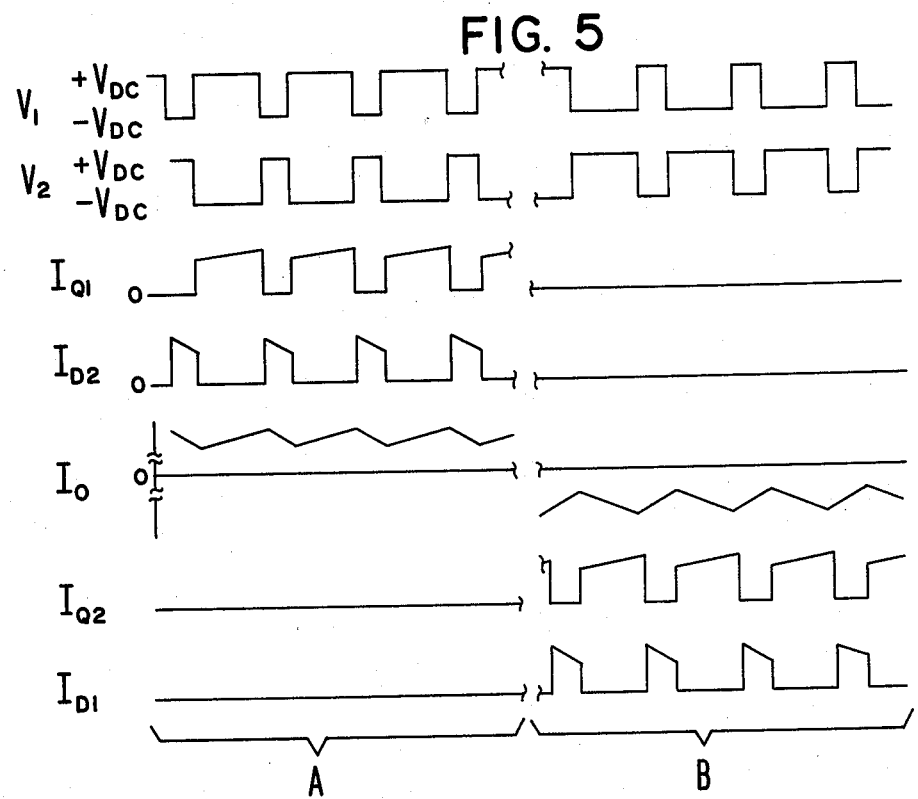
FIG. 5 depicts wave forms of the system during a small portion of the line frequency cycle when the system is operating in a forward power transfer mode.

In the active condition, wherein the converter 10 is driving a purely resistive load, net power flow is out of the battery 30, and operation is depicted in FIGS. 4 and 5 as follows: switches 52 and 54 are alternately externally driven at a duty cycle between 50% and 100% during respective alternate halves of the line frequency cycle. Switch 52 is driven during the positive half cycle, and switch 54 is driven during the negative half cycle varying from a minimum 50% duty cycle at the null of the load current $I_o$ to a duty cycle approaching 100% at maximum of the load current $I_o$. The duty cycle varies over the line frequency cycle directly corresponding to the desired secondary voltage level $V_s$. Load current $I_o$ is exactly in phase with the output or secondary voltage $V_s$. Diode 58 across switch 54 conducts at a duty cycle between about 0% and 50% during the portions of the line frequency cycle when the opposite switch, namely switch 52 is driven at a duty cycle between 50% and almost 100%. However, diode 58 does not conduct while switch 52 is conducting. Transformer 75 is a symmetric inductor typically capable of storing flux for a period which is large compared to the driving frequency of the switches 52, 54. Current flows alternately as $I_{Q1}$ in the first winding 72 and then as $I_{D2}$ in the second winding 74, but never simultaneously. A one-to-one turns ratio is chosen for flux storage transformer 75 to assure that an instantaneous cutoff of current $I_{Q1}$ through the first winding 72 will create instantaneous current $I_{D2}$ through the second winding 74 at exactly the same level.

The operation is best understood in reference to FIGS. 4 and 5. FIG. 4 illustrates output current $I_o$ of I/O transformer 36, core flux $\Phi$ of flux storage transformer 75, and duty cycles of first switch ($Q_1$), second diode 58 ($D_2$), second switch 54 ($Q_2$) and first diode 56 ($D_1$). Activity during segments A and B of the duty cycle, arbitrarily selected at 75% referenced to the switches 52, 54, is shown in the two portions of FIG. 5, the first portion corresponding to segment A and the second portion corresponding to segment B. FIG. 5 sets forth voltages $V_1$ and $V_2$, and currents $I_{Q1}$, $I_{D2}$, $I_o$, $I_{Q2}$ and $I_{D1}$, as identified in FIG. 2.

In operation, referring to segment A of FIGS. 4 and 5 in connection with FIG. 2, when switch 52 is switched on externally, current $I_{Q1}$ is caused to flow to the input terminal of the first winding 72, thereby establishing a voltage at $V_1$. Switch 52 is externally switched off after a predetermined interval. The voltage polarity across both the first winding 74 and second winding 74 of transformer 75 is then instantaneously reversed. Current $I_{Q1}$ is cut off in the first winding 72 and the output terminal $V_2$ of the second winding 74 is clamped to the input voltage $V_{DC}$ at line 24 through second diode 58, diode 58 being forward biased by the instantaneous change in voltage level. The second end tap at node $V_1$ of the first winding 72 is thereby clamped to a DC level equal to the input voltage $V_{DC}$, but of reversed voltage polarity. Further, the voltage across first switch 52, now open, is twice the input voltage $V_{DC}$.

The effect is illustrated in FIG. 5 under column A. In this illustration, the duty cycle is selected to the 75%. Where the input voltage is $+V_{DC}$ the voltage at node $V_1$ is instantaneously switched between $+V_{DC}$ and $-V_{DC}$. In contrast, the voltage at node $V_2$ is switched between $-V_{DC}$ and $+V_{DC}$. Current flow through first switch 52 is discontinuous with a duty cycle of 75%. Current flow through second diode 58 is also discontinuous but with a duty cycle of 25%, diode 58 conducting whenever switch 52 is not conducting, and visa versa. The current through second switch 54 and first diode 56 is invariably zero during segment A. However, the load current $I_o$ at the secondary of the I/O transformer 36 is substantially continuous (with a small ripple), as shown in FIG. 5. The current wave form $I_o$ for the entire line frequency cycle is shown in FIG. 4. The wave form of the flux of $\Phi$ is also shown in FIG. 4. The wave shape is established by external control of the duty cycle of first and second switches 52, 54.

Segment B of FIG. 4 and FIG. 5 illustrate the operation of the circuit in the forward transfer mode during the negative portion of the line frequency cycle. A duty cycle of 75% at switch 54 is depicted in segment B as in segment A with respect to switch 52. In segment B operation, current flows through second switch 54 and first diode 56, whereas no current flows through first switch 52 and second diode 58. Specifically, during the negative portion of the line frequency cycle, second switch 54 is switched on externally, causing current to flow to the input terminal of the second winding 74 of transformer 75 to establish the voltage $V_{DC}$ at node $V_2$ at its second end tap. Second switch 54 is then externally turned off after a predetermined interval. The voltage polarity across second winding 74 is thereupon instantaneously reversed. The second end tap of the first winding 72 is clamped to the DC source voltage $V_{DC}$ through the forward bias of the first diode 56. Consequently, the voltage at node $V_2$ of the second end tap of the second winding 74 is clamped to the reversed polarity level of the DC source voltage, while the voltage across second switch 54, now open, is reversed biased at a level equal to twice the DC source voltage.

Current $I_{Q2}$ from the second winding 74 of the flux transformer 75 is initially conducted through primary 35 to battery terminal 26. When second switch 54 opens, however, the current $I_{Q2}$ flowing into primary 35 is instantaneously replaced by the current $I_{D1}$ flowing through first winding 72 and through primary 33 as a consequence of residual flux in transformer 75. Power is thus transferred continuously from the battery 30 to the AC line 32, 34 by induced current $I_o$ in the secondary 37. Net power flow is from the battery.

Figure 6:
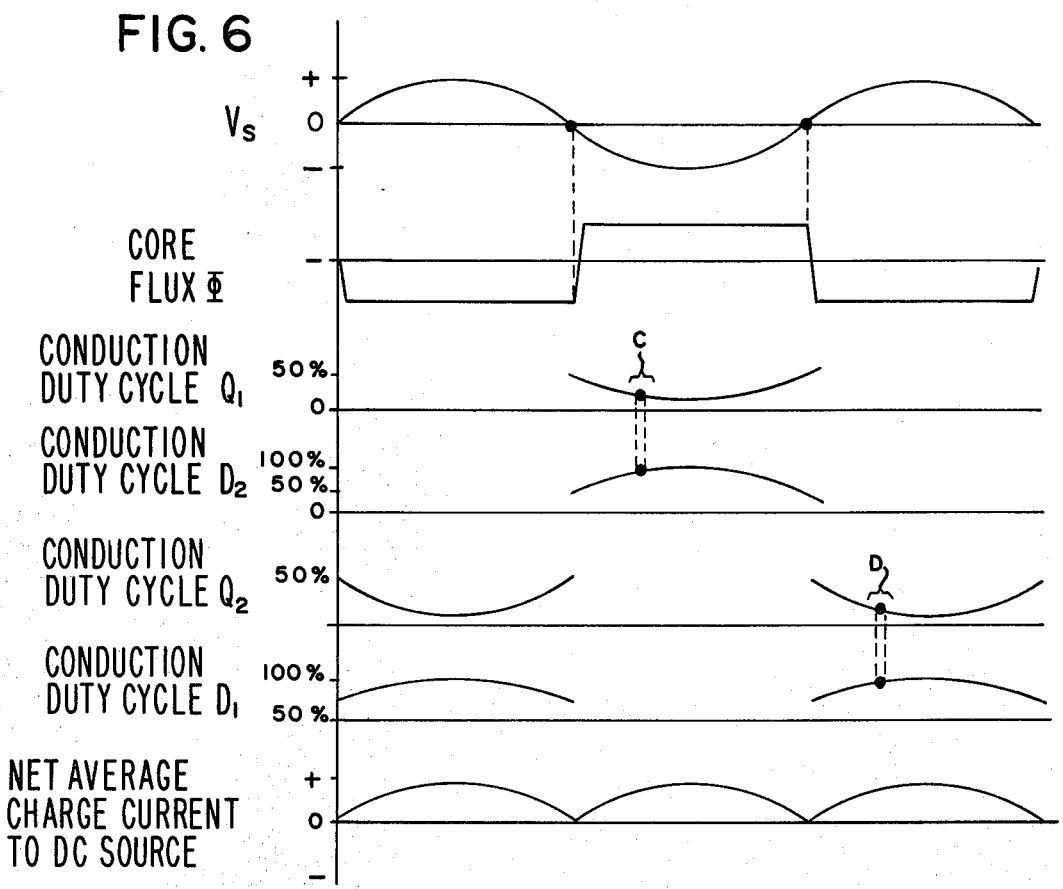
FIG. 6 depicts wave forms and duty cycles of the system over a repetitive line frequency cycle during its standby condition when the battery is being charged.
Figure 7:
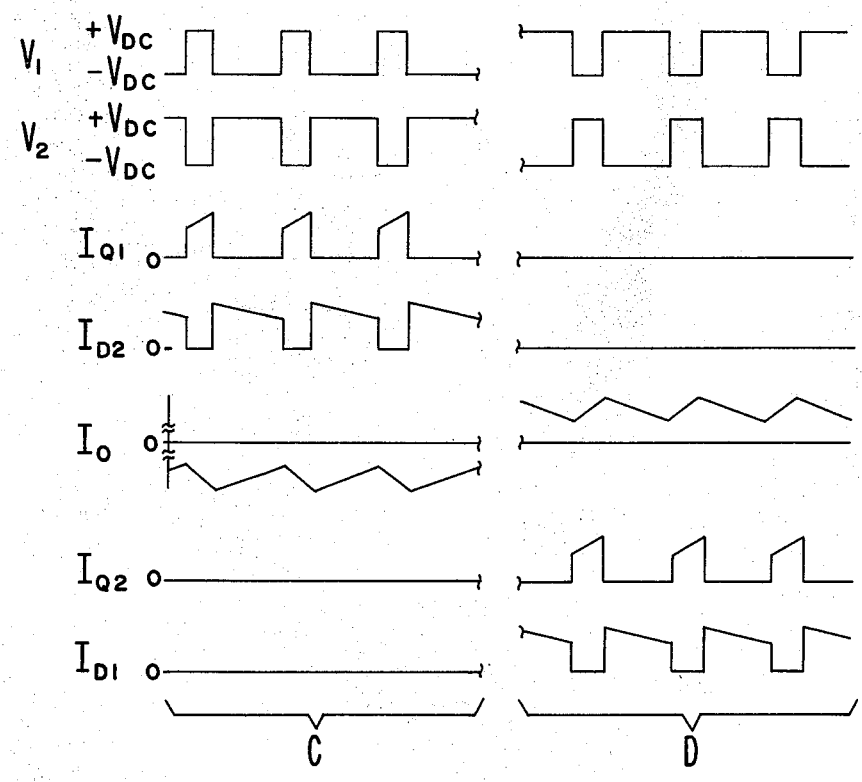
FIG. 7 depicts wave forms of the system during a small portion of the line frequency cycle when the system is operating in a power recovery mode or charging mode.

Segments A and B of FIG. 5 have illustrated forward power transfer. Turning to FIG. 6 and FIG. 7, segments C and D illustrate the power recovery mode as is employed for battery charging. This mode occurs typically during the standby condition. In the standby condition, a voltage $V_s$ (FIG. 6) is imposed by the AC mains across lines 32, 34. Power flow is from the secondary 37 to the primaries 33, 35 of the I/O transformer 36. Operation of the converter 10 in the power recovery mode is as follows: first and second switches 52, 54 are externally driven at a high frequency duty cycle sufficient to establish a predetermined current in the flux storage transformer 75. The core flux $\Phi$ in the flux storage transformer 75 is illustrated in FIG. 6. The peak level is established by a complementary relation between the duty cycle of the switches 52, 54 and the source voltage $V_s$ across the secondary 37 at I/O transformer 36. As before, switches 52 and 54 are driven during alternate periods of the line frequency cycle. During power recovery, however, second switch 54 is driven during the positive half cycle and first switch 52 is driven during the negative half cycle (the positive half cycle is defined as the cycle during which the voltage $V_s$ is positive). The drive with respect to the active condition during a resistive load described in connection with FIGS. 4 and 5 is thus reversed.

Second diode 58 across second switch 54 conducts at a duty cycle greater than 50% during the driving portion of the line frequency half cycle of first switch 52, but second diode 58 does not conduct simultaneously with first switch 52. Similarly, first diode 56 across first switch 52 conducts at a duty cycle greater than 50% during driving portion of the line frequency half cycle of the second switch 54, but the diode 56 does not conduct simultaneously with second switch 54. The sum of the duty cycles of second diode 58 and first switch 52 is always 100%. Similarly, the sum of the duty cycles of first diode 56 and second switch 54 is always 100%.

The segment corresponding to C in FIG. 6 will be explained and illustrated in FIG. 7. Current $I_{Q1}$ is caused to flow from the DC source to the input terminal of the first winding 72 of transformer 75 when first switch 52 is externally switched on during its active portion of the line frequency cycle. The flux $\Phi$ in transformer 75 increases very rapidly when current flows. The maximum flux $\Phi$ has been externally set at the predetermined level as a consequence of the voltage differential on the secondary of I/O transformer 36 and the selected duty cycle of the switch 52. This may be done by externally turning the switch 52 off when the flux level $\Phi$ in transformer 75 is at the predetermined flux level. External control is effected by sensing and responding to current flow in the DC source loop, as measured at resistor 49.

When first switch 52 is turned off, the voltages across the windings 72 and 74 of the transformer 75 instantaneously reverse. Thereupon second diode 58 is forward biased, and the slowly decreasing flux in transformer 75 induces current flow $I_{D2}$ in the second winding 74 of transformer 75 through second diode 58. Current flow $(I_{D1}=I_{DC})$ is into the DC source when the voltage at node $V_1$ is above and approximately at the level of the source voltage $V_{DC}$. Thus the voltage source is charged.

When first switch 52 conducts, however, current flow $(-I_{DC}=I_{Q2})$ is out of the DC source. For this reason, the duty cycle of the switch 54 is selected to be less than 50% in order to maintain constant peak flux in flux storage transformer 75 and net current flow into the DC source to charge the DC source.

The mode of operation wherein the slowly changing flux $\Phi$ in transformer 75 induces current flow $I_{DC}$ into the DC source may be called the "flyback" mode, since net power flow through transformer 75 is into the power source.

Operation of the converter 10 during the positive portion of the line frequency cycle is illustrated at segment D of FIG. 6 and of FIG. 7. Analogous with the operation during the first portion, second switch 54 is switched on externally, causing current $I_{Q2}$ to flow from the DC source to the second end tap of second winding 74 for a fraction less than 50% of the duty cycle, the fraction being selected to establish a predetermined flux level in the transformer 75. Second switch 54 is then turned off to cause the voltages across both windings 72 and 74 to instantaneously reverse, further causing first diode 56 to be forward biased. The slowly decreasing flux in transformer 75 induces current flow $I_{D1}$ in the first winding 72 of transformer 75 to flow into the DC source through first diode 56. Since the duty cycle of the first diode 56 is greater than the duty cycle of the second switch 54, there is a net flow of power into the power source, thus charging the power source.

Figure 8:
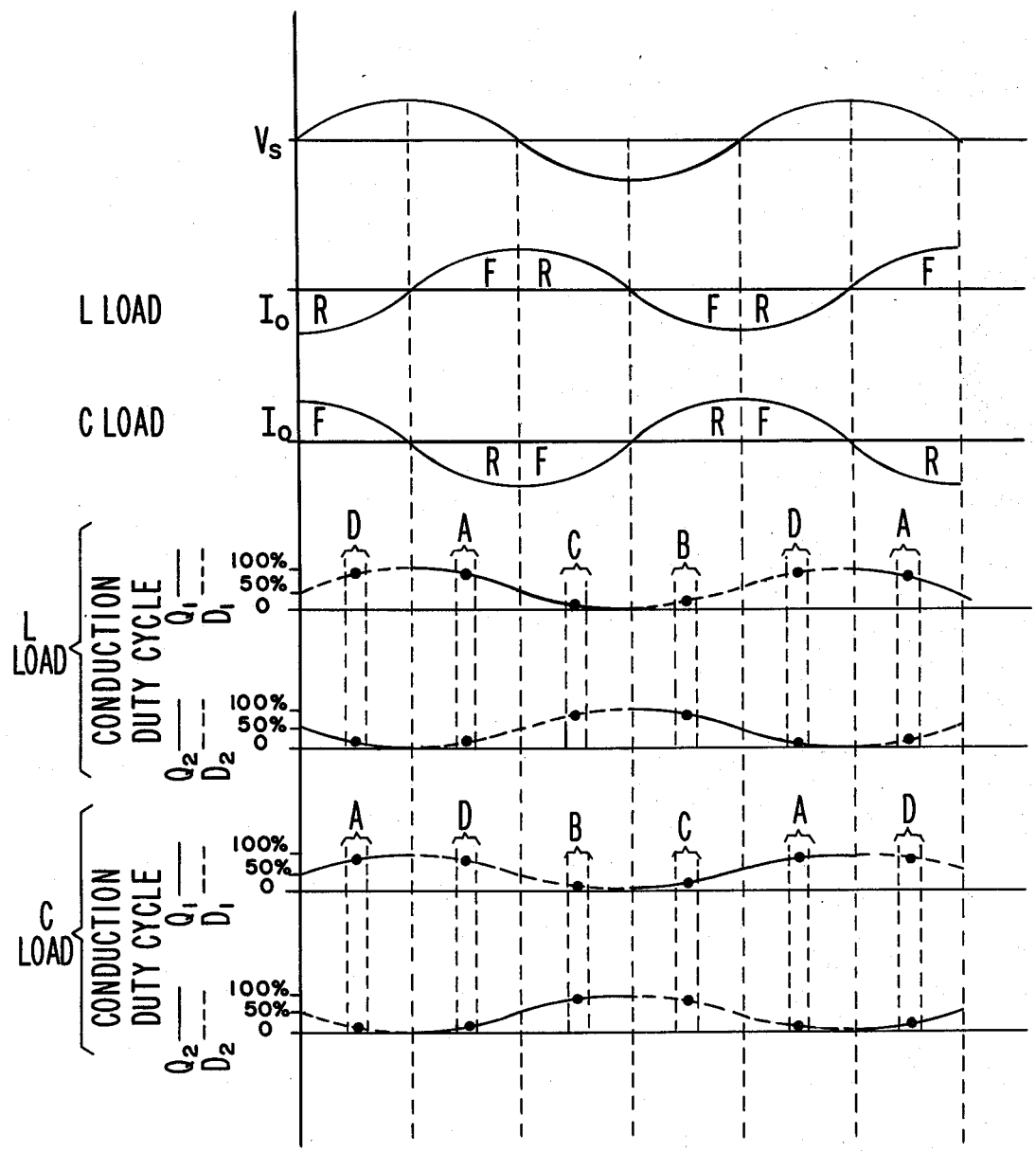
FIG. 8 depicts wave forms and duty cycles of the system over a repetitive line frequency cycle when the system supplies power to inductive and capacitive reactive loads during the active condition.

The converter 10 can be efficiently employed to drive loads having reactive components. FIG. 8 illustrates operation of the converter when the load is either purely inductive (L load) or purely capacitive (C load)

wherein the phase difference between output voltage $V_s$ and output current $I_o$ is ninety degrees The operation of the converter 10 is readily generalized for loads having mixed reactive and resistive loads by noting that current and voltage phase differences become less than ninety degrees and that the conduction sequence of the paired diodes and switches always follows the polarity of the load current while the duty cycle of the switches always tracks the amplitude of the output voltage.

Operation is as follows. The drive of the switches 52 and 54 tracks the amplitude and polarity of output voltage $V_s$ so that switch 52 switches only when $V_s$ is of positive polarity and switch 54 switches only when $V_s$ is of negative polarity. The drive duty cycle tracks the amplitude of the output voltage $V_s$. However, the *conduction* duty cycles of the first switch 52 and the second switch 54 are constrained to track the polarity of the load current $I_o$. First switch 52 conducts only when load current $I_o$ is of positive polarity, and second switch 54 conduducts only when load current $I_o$ is of negative polarity. The sum of the conduction duty cycles of the switch and diode pairs 52, 56 and 54, 58, respectively, is at any instant 100%.

The constraint or rapid change in flux $\Phi$ in the flux storage transformer 75 dictates the conduction sequence of the switches 52, 54 and diodes 56, 58. Reversal of the polarity of load current $I_o$ and consequent reversal of flux polarity in transformer 75 constrains the diodes 56, 58 to become forward biased and to conduct in a different sequence and during different intervals as compared to sequences and intervals for a purely resistive load. The switch 52 or 54 can receive base drive during conduction of the diode 56 or 58 coupled across it, but the switch 52 or 54 does not conduct while the diode 56 or 58, respectively, conducts.

For a purely reactive load, average current over any half cycle is zero, and the average conduction duty cycle of each of the switches 52, 54 during the allowable switching cycle is fifty percent. Thus, there is no net power transfer to the load. In contrast, for a mixed resistive and reactive load, the average conduction cycle of each of the switches 52, 54, which only conduct power away from the DC source, is greater than 50% during its allowable switching cycle, since the phase of the output current $I_o$ shifts with respect to output voltage $V_s$ to less than ninety degrees. There is thus net power flow from the DC source to the AC load.

FIG. 8 illustrates the output voltage $V_s$, the output current $I_o$ for an inductive load (L load), and the conduction duty cycle for an L load for paired switch 52 ($Q_1$) and diode 58 ($D_2$) and for paired switch 54 ($Q_2$) and diode 56 ($D_1$). In addition, there is illustrated the output current $I_o$ for a capacitive load (C load), and the conduction duty cycle therefor. The C load and L load curves are keyed to show where power transfer is forward to the load (F) or reverse from the load (R). The conduction duty cycles are keyed to illustrated wave form segments previously explained. For example, the sequence of an L load conduction duty cycle follows the sequence of typical segments D, A, C and B, respectively, in that order as was explained in FIGS. 5 and 7. However, the sequence of a C load follows the sequence of typical segments A, D, B and C, respectively.

Those of ordinary skill in the art can construct numerous controllers suitable for use with the converter 10 as hereinabove described in accordance with the timing set forth in FIGS. 4-8. One suitable controller 20 having certain novel features is depicted in FIG. 3. The controller 20 is operative to receive an input AC sense signal through line 82, an output AC sense signal, or feedback through line 84, a battery current sense signal through line 46a and a battery voltage sense signal through line 46b. The controller 20 is operative to provide a switch signal through line 86 to line input control switch 40 and drive signals through lines 42 and 44 to first and second switches 52, 54, respectively.

The controller 20 comprises the following elements: a first comparator 106, a peak detector 107, a reference 108, a phase locked loop 110, a controlled switch 112, a summer 100, a ramp signal generator 102 which runs a high frequency such as 20 kHz, a differential comparator 104, a rectifier 120, a second comparator 124 and reference 126, a first OR gate 128, a pulse generator 132 which also operates at 20 kHz, a latch 134, first three input AND gate 140, a second three input AND gate 142, a third AND gate 150, a fourth AND gate 152, a second OR gate 154, a comparator 158, and reference 160, and a charging cycle timer 164.

The AC input sense line 82 is coupled to the phase locked loop 110, to the rectifier 120 and to the negative input of the comparator 106 through peak detector 107. The reference 108 is coupled to the positive input of the comparator 106. In operation, whenever the peak voltage on AC input sense signal line 82 drops below the peak level set by the reference 108, the comparator 106 enables the switch line 86. Switch line 86 also serves as an active enable line to enable operation of first switch 112 and second OR gate 128 as well as first OR gate 154. The rectifier 120 is coupled to comparator 124 whose output is coupled through OR gate 128 to an input of AND gates 140 and 142. Reference 126 is coupled to the negative input of comparator 124. The AC output sense line 84 is coupled to the negative input terminal 118 of summer 100. The output of phase locked loop 110 is coupled through with 112 to the positive input terminal 116 of summer 100. The output of summer 100 is provided to the positive input of the differential comparator 104. The negative input of the differential comparator 104 is supplied by the ramp generator 102. The output of the differential comparator 104 is a complementary pair of signals on lines 136 and 138 which are coupled, respectively, to second inputs of the three input AND gates 140 and 142.

The third inputs of AND gates 140, 142 are coupled to via line 144 to the output of latch 134.

The current limit detector 146 and the pulse generator 132 are coupled to drive the latch 134. Through input 157 from pulse generator 132, the latch 134 is turned ON. Through input 148 from the current limit detector 146 the latch 134 is turned OFF. The current limit detector senses the current via line 46A at the battery 30 (FIG. 1). The output of gates 140, 142 are coupled to first inputs of dual input AND gate 150, 152, respectively.

The OR gate 154 is coupled to the second inputs of third AND fourth and gates 150 and 152 to assure that the converter 10 is active during the active condition and during battery charging condition. The comparator 158 is coupled to an input of OR gate 154. Comparator 158 is controlled by a relatively long time base charging cycle timer 164. Whenever the battery voltage as measured on line 46B is less than a predetermined reference level set by reference 160 during an arbitrary charging period, comparator 158 is activated. This is typically during the standby condition when the active enable line 80 is OFF.

In the standby condition, AC is present on both the input line 82 and on the output line 84. Since line input control switch 40 (FIG. 1) is closed in the standby condition, the phase difference is zero between input sensed AC and output sensed AC. Switch 112 is however off, and a large amplitude AC signal is provided to summer 100, which is phase reversed and provided to the positive input of differential comparator 104. The relatively small signal output of ramp generator 102 is ineffective so that the output of the differential comparator 104 is essentially a phase reversed line frequency square wave which is employed subsequently to drive either switch 52 or switch 54 (FIG. 2) through lines 42 and 44 and thereby to control source current to the voltage source across terminals 24 and 26 of converter 10.

Specifically, the output signals on lines 136 and 138 are alternating square waves with a 50% duty cycle having typically a 60 Hz frequency. If comparator 124 and OR gate 128 were always active, and the latch 134 were always on, the 50% duty cycle, 60 Hz signals would be propagated through the three-input AND gates 140 and 142, and thence through the AND gates 150, 152 whenever the charging cycle timer 164 has enabled comparator 158 and the sensed battery voltage via line 46B is less than the reference level of reference 160.

A pure 50% duty cycle square wave can however cause converter failure due to excessive current. For this reason, current limiting is recommended. Current limit detector 146 is operative to sense source current though sensor line 46A and to turn off gates 140, 142 though latch 134. A high frequency (about 20 KHz) pulse train from pulse generator 132 turns the latch 134 on and thereby activates either the output of gate 140 or of gate 142 (depending upon the state of lines 136 and 138). Source current through the flux storage transformer 75 (FIG. 2) rises relatively rapidly until it reaches a predetermined limit level, as sensed by the current limit detector 146, whereupon the latch 134 is turned off until turned on by the next pulse from the pulse generator 132. The residual flux in the flux storage transformer 75 (FIG. 2) maintains current near the established current limit for the duration of the on state, the duration being established by differential comparators 104 and OR gate 128. The wave form for flux Φ (FIG. 6) illustrates the flux characteristic as hereinabove described.

It is not always necessary or desirable to provide drive via lines 42 or 44 at all times. Charging efficiency is improved for example if current is allowed to flow only at or near peaks in AC input voltage. For this purpose, the input AC sense signal is rectified by full wave rectifier 120 and compared with the level of reference 126. The level of the reference 126 above zero is inversely proportional to the conductive period of the comparator 124. Hence an increased reference level increases the period during which flux Φ is zero.

In the event AC mains power vanishes or is reduced below a predetermined peak, the controller 20 initiates the active condition of the converter 10 and opens power input control switch 40 (FIG. 1). Specifically, when the AC input sense line 82 fails to produce a peak above the level sensed by peak level detector 107 and set by reference 108, comparator 106 enable line 86 (or sets it to a high state in the illustrated controller of FIG. 3), the active enable in turn enables the input of AND gates 140 and 142 through OR gate 128, and the inputs of AND gates 150 and 152 through OR gate 154, and it closes switch 112 whereby the output signal of the phase locked loop 110 is applied to the positive input of summer 100. If the AC input signal is still present, the output of the phase locked loop 110 remains locked in phase and frequency to the AC input signal.

If the AC input signal fails, then the phase locked loop 100 locks to its internal clock to generate a sine wave output at the positive input of the summer 100. In either case, the output of summer 100 is a small sine wave error signal. The error signal is compared with a comparably small ramp signal of about 20 kHz from ramp signal generator 102.

The differential comparator 104 compares the relatively slowly varying line frequency error signal applied at its noninverting input with the relatively rapidly varying ramp signal applied at its inverting input. The differential outputs produce a pair of complementary high frequency square wave signals whose duty cycles vary sinusoidally in a complementary manner at the rate of the line frequency. The noninverting phase output on line 138, which represent a phase reversal with respect to the AC output sense line 82, is applied through gates 140 and 150 to second drive line 44. Drive signals are applied to first and second switches 52 and 54 during all segments of the line frequency cycle. However, current flow is such that first switch 52 never conducts during the same segment in which second switch 54 conducts, and visa versa. Hence, the conduction duty cycle of one switch is zero during conduction of the other switch.

The latch 134 is essentially ineffective and locked on during the active condition. Current sensed at line 46A is never expected to exceed the level set by the current limit detector 146, so the first pulse of pulse generator 132 will turn on latch 134 and latch up its output applied to gates 140 and 142. If, however, a failure occurs in the converter 10 causing excessive current, the limit detector 146 will respond and protect against damage.

The above described controller 20 responds to all modes and conditions of the converter 10 in order to provide a suitable drive signal to properly charge and discharge the battery 30.

The invention has now been described in connection with a specific controller and a specific embodiment of the converter. Obvious modifications and improvements can be made without departing from the true scope and spirit of the invention.

For example, capacitors and filters may be added in the primary and secondary of the I/O transformer to minimize high frequency core losses and noise and for transient suppression without departing from the scope of the invention. Similarly, the location of switches and current or voltage sensing devices within the two current loops of the primary of the I/O transformer can also be changed without departing from the scope of the invention. Still further, the converter can be operated as a standalone DC power source for resistive loads without a feedback sensing controller as described herein by use of simple open loop duty cycle control of the power switches. Finally, polarities of elements within the primary loops can be reversed so long as the relative polarities are observed. Accordingly, it is not intended that the invention be limited except as indicated by the appended claims.

I claim:

1. An apparatus having first and second DC power terminals for use in transferring electric power between an AC power system and a DC power storage device, such as a battery, said apparatus comprising:

a push-pull transformer having a first winding for interfacing with said AC power system, and a second winding, said second winding having a first end tap, a second end tap and a center tap, said center tap being coupled to said first DC power terminal;

a flux storage transformer capable of storing flux for a period which is large compared to a switching frequency of current through said flux storage transformer comprising a third winding and a fourth winding, said third winding being in a first current path with third and fourth end taps and said fourth winding being in a second current path with fifth and sixth end taps, said third and fifth end taps having the same polarity, said third end tap being coupled in said first current path to said first end tap of said push-pull transformer and said sixth end tap being coupled in said second current path to said second end tap of said push-pull transformer, said fourth end tap being coupled in said first current path to said second DC power terminal and said fifth end tap being coupled in said second current path to said second DC power terminal;

first bi-directional switching means in said first current path;

second bi-directional switching means in said second current path;

means for pulse width modulating said first switching means and said second switching means on and off to direct current flow in said first and second current paths in a first direction to said first and second DC power terminals;

said first and second switching means each including a diode which is responsive to a forward bias in said first and second current paths, respectively, to permit current flow only in a second direction in said first and second current paths, respectively, through said first and second DC power terminals, said second direction being the reverse of said first direction;

said modulating means being constrained to modulate only said first switching means or only said second switching means so as to define a permissable current path alternately (a) from said second DC power terminal in said first direction through said first current path into said third winding of said flux storage transformer in order to generate a flux, which, upon opening of said first switching means, induces a current in said fourth winding in second direction through said second current path back to said second DC power terminal without reversing current flow polarity in said first winding of said push-pull transformer, or (b) from said second DC power terminal in said first direction through said second current path to said fourth winding of said flux storage transformer in order to generate a flux, which, upon opening of said second switching means, induces a current in said third winding in second direction through said first current path back to said second DC power terminal without reversing current flow polarity in said first winding of said push-pull transformer, such that the duty cycles of said switching means determine whether net DC power flow is from or to said DC power terminals.

2. A continuous AC power source for use with a DC power storage device, such as a battery, said power source comprising:

a bi-directional converter coupled between said power storage device and AC input/output terminals, said bi-directional converter including a first transformer means for coupling to said AC input/output terminals, second transformer means coupling said first transformer means to said power storage device and operative to store flux, and bi-directional switching means;

a switch coupled between an AC mains source and said AC input/output terminals; and a controller coupled to sense the input AC power, the output AC power and battery current and further coupled to control said switch and said converter, said converter being operative to modulate said bi-directional switching means at a rate substantially higher than the operating frequency of said AC power source to transfer power from said battery to said AC input/output terminals only when said switch is open and the polarity of the sensed load voltage is the same as the polarity of sensed load current.

3. A continuous power source according to claim 2 wherein said bi-directional switching means of said bi-directional converter further comprises a first externally controlled switch, a second externally controlled switch, a first diode coupled across said first switch, a second diode coupled across said second switch, and wherein said first transformer means comprises a first input/output transformer having push-pull primaries and a center tap, and wherein said second transformer means has a first winding coupled in a first current loop through said first switch and one primary of said first transformer, said second transformer further having a second winding coupled in a second current loop through said second switch and a second primary of said first transformer, and wherein the polarity of coupling between said first winding and said second winding is reversed, said first and second switches being coupled to a first terminal of a DC power source and said center tap of said first transformer being coupled to the other terminal of said DC power source.

4. In a power source having a bi-directional converter, a controller coupled to said bi-directional converter, a battery coupled to said converter, and AC input/output terminals coupled to said converter, a method for converting DC power to AC power and AC power to DC power, said method comprising the steps of:

monitoring the voltage phase and level of an AC source across said input/output terminals;

monitoring the voltage phase of an AC load, across said input/output terminals;

establishing a current through push-pull windings on the battery side of an input/output transformer which is coupled to said input/output terminals, said current being established by a second transformer which is capable of storing flux sufficient to sustain continuous current flow at an intended AC operating frequency, said second transformer having a first winding and a second winding, said first and second windings being interactive and in reverse polarity to one another relative to said push-pull windings;

monitoring the current established through said input/output transformer as a consequence of said flux; and in response to monitored current and voltage, causing a first current through said first winding of said second transformer to switch on and off according to a preselected duty cycle and at a rate substantially higher than said intended AC operating frequency to induce a second current in said second winding to flow in a reverse sense relative to a source of current through said second transformer, said duty cycle being selected to supply either net power to said AC load or recover net power for charging said battery.

5. In a circuit for transferring power bi-directionally between an AC source or load and a DC storage device such as a battery, a method for transferring electrical power therebetween comprising:

pulse width modulating current into a flux storage device at a switching frequency substantially higher than a desired AC operating frequency and controlling said pulse width modulating to establish said AC operating frequency; and suppressing with flux storage substantially all transient power components at frequencies substantially greater than said operating frequency such that power is generated substantially only at said operating frequency and with a desired waveform.

* * * * *